(12) United States Patent
Kubo et al.

(10) Patent No.: US 7,164,363 B2
(45) Date of Patent: Jan. 16, 2007

(54) ARTICLE IDENTIFICATION DEVICE

(75) Inventors: Jiro Kubo, Osaka (JP); Keiji Yasui, Kawanishi (JP); Takashi Horinouchi, Ibaraki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 185 days.

(21) Appl. No.: 10/497,772

(22) PCT Filed: Nov. 25, 2003

(86) PCT No.: PCT/JP03/14966

§ 371 (c)(1),
(2), (4) Date: Jun. 4, 2004

(87) PCT Pub. No.: WO2004/049301

PCT Pub. Date: Jun. 10, 2004

(65) Prior Publication Data

US 2005/0067481 A1     Mar. 31, 2005

(30) Foreign Application Priority Data

Nov. 28, 2002   (JP) .............................. 2002-345479

(51) Int. Cl.
*G08B 25/08*   (2006.01)
(52) U.S. Cl. .................. 340/692; 340/5.42; 340/572.1; 235/375; 235/385; 235/492
(58) Field of Classification Search ............. 340/572.1, 340/692
See application file for complete search history.

(56) References Cited

U.S. PATENT DOCUMENTS 5,963,133 A * 10/1999 Monjo ..................... 340/572.1

6,611,673 B1 * 8/2003 Bayley et al. .............. 455/564

(Continued)

FOREIGN PATENT DOCUMENTS

JP        09-261139 A     10/1997

(Continued)

OTHER PUBLICATIONS

Japanese International Search Report for PCT/JP03/14966, dated Feb. 17, 2004.

(Continued)

*Primary Examiner*—Jeffery Hofsass
*Assistant Examiner*—Samuel J Walk
(74) *Attorney, Agent, or Firm*—RatnerPrestia

(57)     ABSTRACT

A user-friendly article identifying device capable of retaining voice data associated with a tag. The device contains a tag reading section; a voice data input section; a storage section; a determining section; a voice data replay section; and a controller for governing all the sections above. First, the tag reading section reads a tag having a specific identifier, and then the voice data input section accepts voice data. Storage section, which contains a voice data table, a tag/address table, and a memo data table, stores voice data from the input section so as to associate with the specific identifier of a tag. The determining section judges whether the tag identifier read by tag reading section is retained in the storage section. Voice data replay section replays the voice data associated with the identifier according to the judgment by the determining section.

10 Claims, 4 Drawing Sheets

U.S. PATENT DOCUMENTS

| | | | |
|---|---|---|---|
| 6,977,579 B1 * | 12/2005 | Gilfix et al. | 340/407.1 |
| 2001/0053206 A1 * | 12/2001 | Muller | 379/88.12 |
| 2002/0121986 A1 * | 9/2002 | Krukowski et al. | 340/825.19 |
| 2003/0155413 A1 * | 8/2003 | Kovesdi et al. | 235/375 |

FOREIGN PATENT DOCUMENTS

| JP | 2001-350485 A | 12/2001 |
|---|---|---|
| JP | 2002-123276 A | 4/2002 |
| JP | 02003006208 A * | 1/2003 |

OTHER PUBLICATIONS

English translation of Form PCT/ISA/210.

* cited by examiner

ARTICLE IDENTIFICATION DEVICE

THIS APPLICATION IS A U.S. NATIONAL PHASE APPLICATION OF PCT INTERNATIONAL APPLICATION PCT/JP03/14966.

TECHNICAL FIELD

The present invention relates to an article identifying device capable of reading information on articles through, for example, a wireless tag attached thereto, and providing a user with the information by voice.

BACKGROUND ART

According to statistics, the number of people having weak eyes including the blind amounts to 350,000 in Japan. They live with difficulties and inconveniencies in daily life as a member of society, since most of information from the outside is obtained by visual recognition. To help such people, various studies on information technology (IT)-based support system have been making progress.

For example, Japanese Patent Non-Examined Publication No. 2001-350485 discloses a fixed-type wireless article identifying device for supporting such a handicapped person living alone. To be more specific, articles to be identified have a wireless tag that contains information on each article. When a tagged-article is brought close to the article identifying device, information on the article is provided as a voice. In recent years, there has been a growing demand for more convenient device-not only a fixed-type, but also a mobile device with a compact and lightweight structure.

DISCLOSURE OF THE INVENTION

According to an aspect of the present invention, the identifying device includes a tag reading section for reading information out of a tag; a voice data input section for entering voice data after reading information of a tag; a storage section for storing voice data fed from the voice data input section; and a voice data replay section for replaying voice data stored in the storage section. The user can confirm voice data one by one each time depressing the voice data replay section.

As another aspect of the present invention, the identifying device includes a tag reading section for reading information out of a tag; a voice data input section for entering voice data; a storage section for storing voice data fed from the voice data input section; and a voice data replay section for replaying voice data stored in the storage section. The tag reading section reads a tag with a specific identifier while and/or after the voice data replay section replays voice data stored in the storage section. Thereby, the voice data storage section stores voice data so as to associate with the identifier assigned to each tag.

DETAILED DESCRIPTION OF CARRYING OUT OF THE INVENTION

Figure 1:
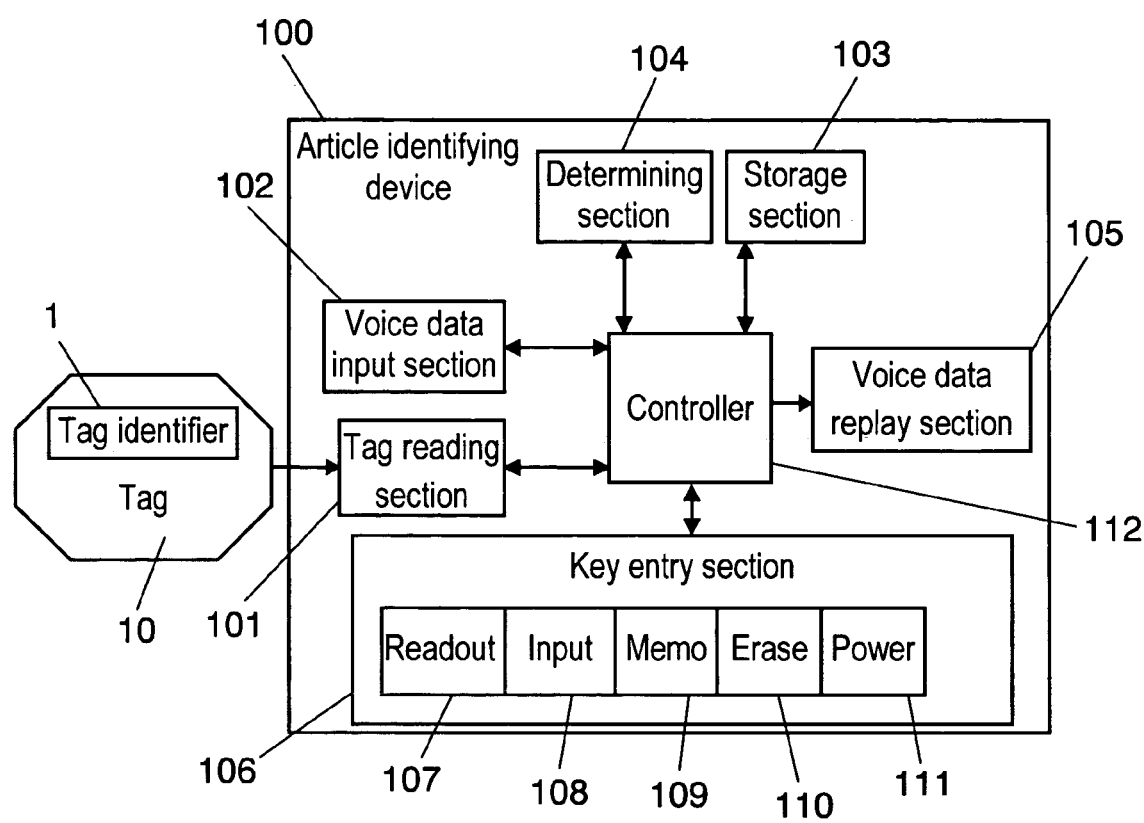
FIG. 1 shows a general constitution of an article identifying device of an exemplary embodiment of the present invention.

The exemplary embodiment of the present invention is described hereinafter with reference to the accompanying drawings. In FIG. 1, tag 10 contains a specific identifier (hereinafter referred to as tag identifier).

Figure 2:
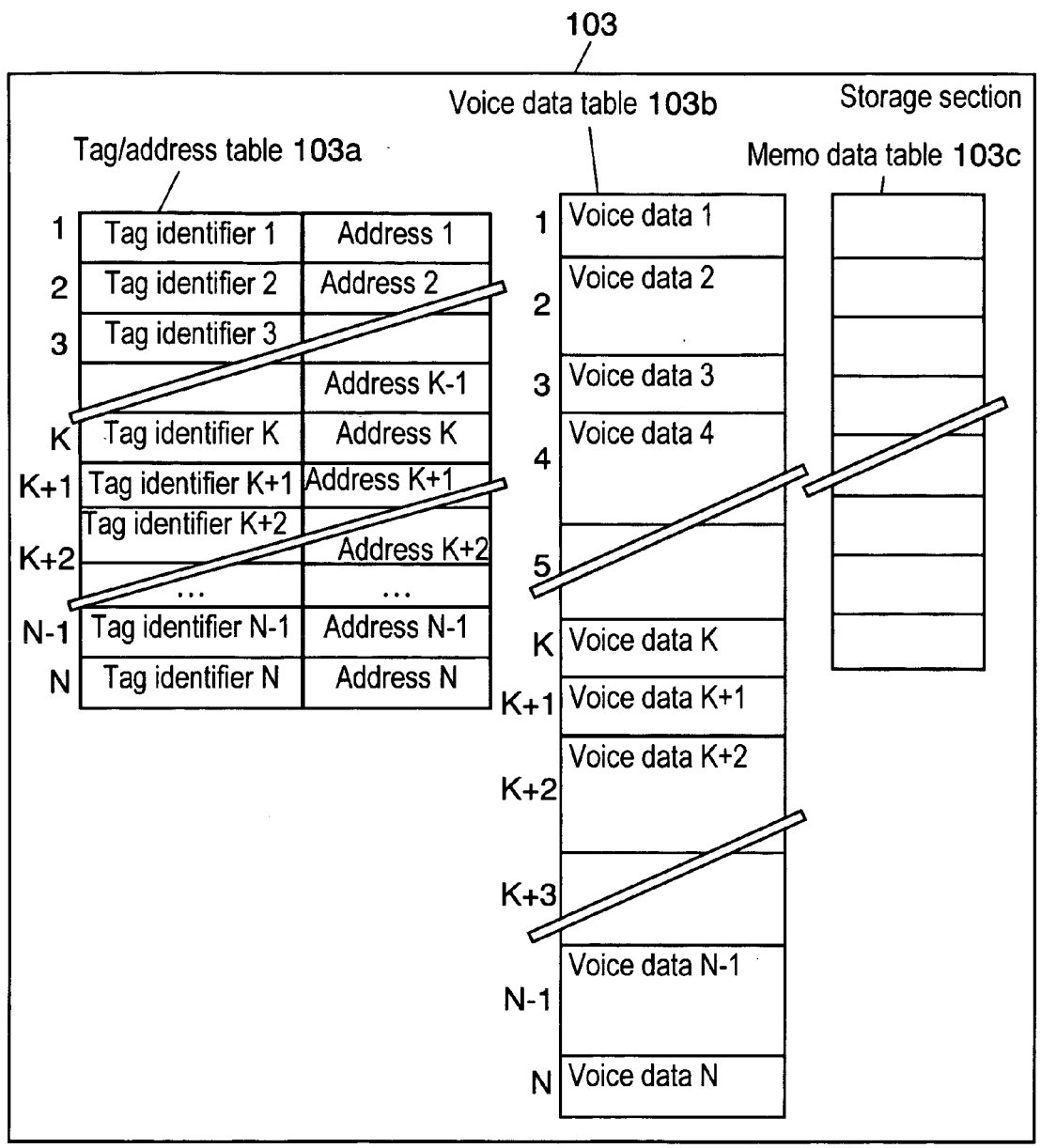
FIG. 2 shows a structure of the storage section of the article identifying device of the embodiment.
Figure 3:
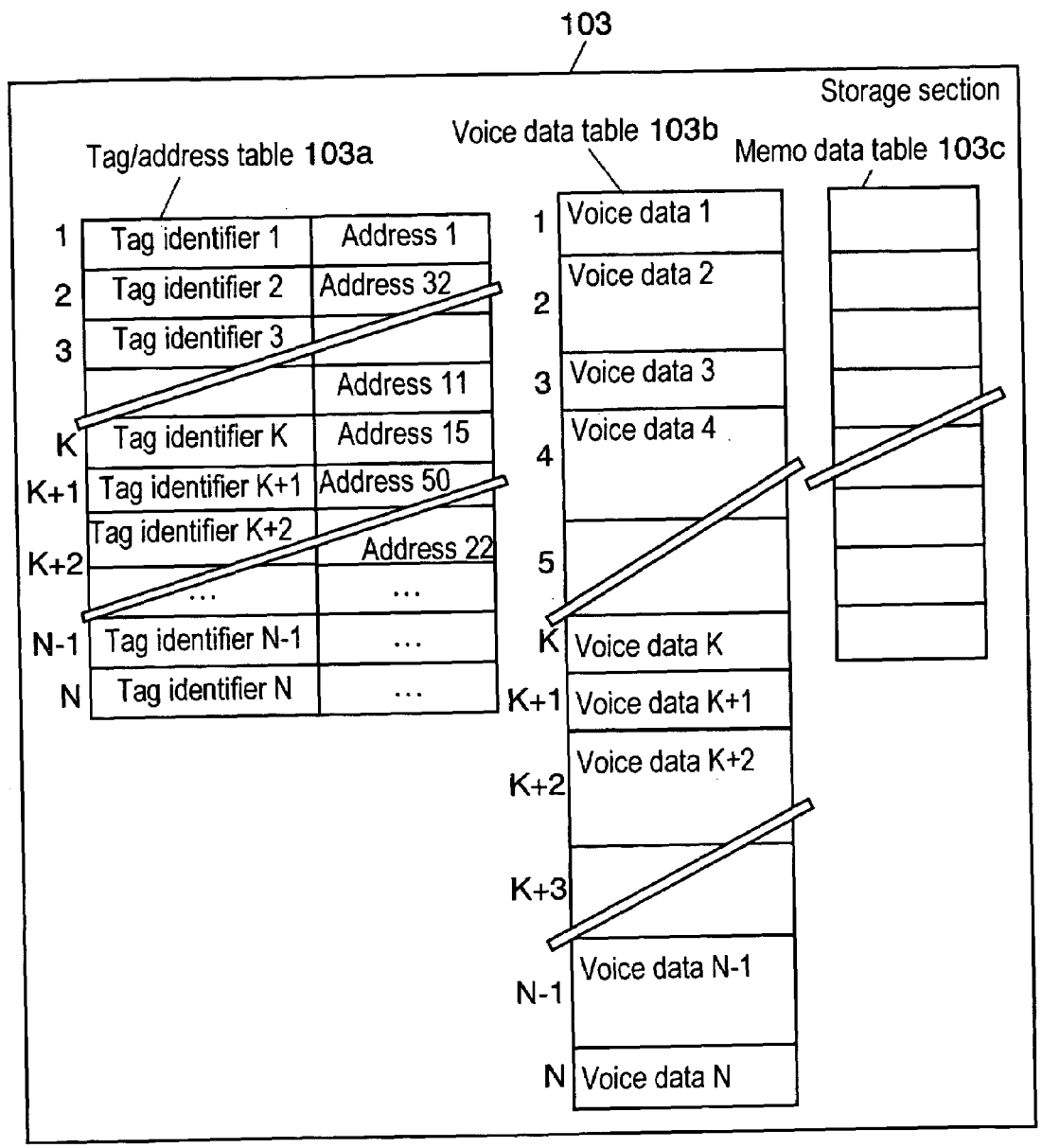
FIG. 3 shows another state of the storage section of the article identifying device of the embodiment.
Figure 4:
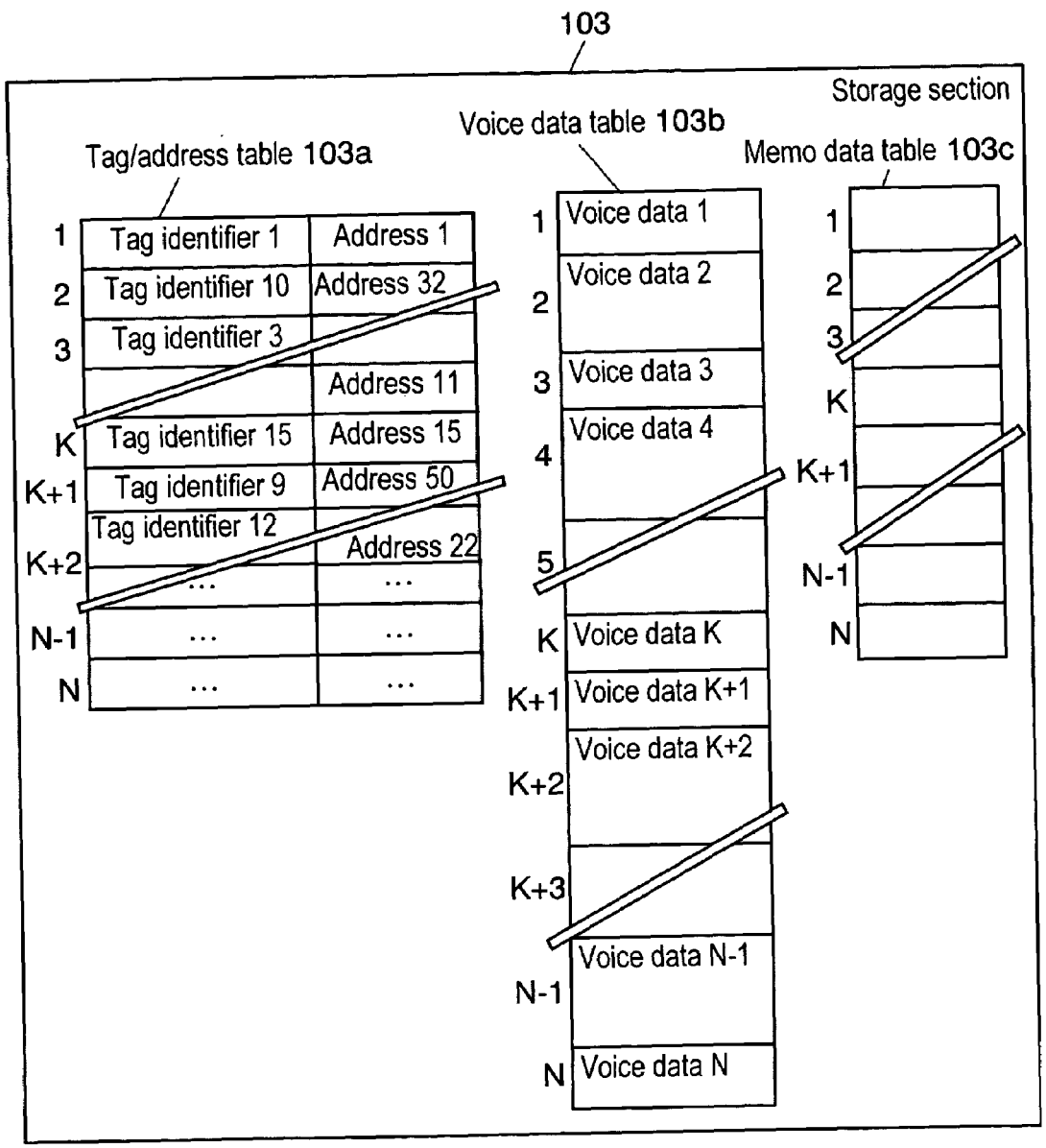
FIG. 4 shows still another state of the storage section of the article identifying device of the embodiment.

Article identifying device 100 can read tag identifier 1 attached to tag 10 via wireless communications. Article identifying device 100 is formed of tag reading section 101; voice data input section 102; storage section 103; determining section 104; voice data replay section 105; key entry section 106; and controller 112. Tag reading section 101, which is formed of an antenna and the like, reads tag identifier 1 of tag 10. Voice data input section 102 inputs voice data after tag 10 is read out. Storage section 103 stores voice data fed from input section 102 so as to associate with tag identifier 1 of tag 10. Storage 103 contains, as shown in FIG. 2 through FIG. 4, tag/address table 103a for storing tag identifier 1 paired with the address of voice data that is associated with tag identifier 1; voice data table 103b for storing voice data, and memo data table 103c for storing memo data as voice message. Determining section 104 judges whether or not tag identifier 1 read by tag reading section 101 is retained in storage section 103. Voice data replay section 105 replays, according to the result from determining section 104, the voice data associated with the identifier.

Key entry section 106, which is responsible for operating article identifying device 100, further includes readout key 107 for starting readout of tag identifier 1 of tag 10; data input key 108 for inputting voice data: memo key 109 for replaying memo data stored in memo data table 103c; erase key 110 for erasing information from storage section 103; and power key 111 for turning identifying device 100 ON or OFF.

Now will be described how to input voice data into article identifying device 100 with reference to FIG. 1.

First, depressing power key 111 turns identifying device 100 ON. Further, depressing readout key 107 enables controller 112 to send readout command to tag reading section 101. Receiving the command, tag reading section 101 reads out tag identifier 1 of tag 10 attached with an article. Next, determining section 104 judges whether or not tag identifier 1 read by tag reading section 101 is retained in storage section 103. When tag identifier 1 is found in tag/address table 103a of storage section 103, the voice data associated with tag identifier 1 is fetched from voice data table 103b. The voice data is replayed from voice data replay section 105 as a voice. On the other hand, when tag identifier 1 is not found, a beep sound by a beeper (not shown) tells the user that the tag identifier is not stored in article identifying device 100. In this case, voice message can tell, instead of the beep sound, the absence of the tag identifier.

When the user depresses data input key 108 after tag identifier 1 of tag 10 is read out, controller 112 enables voice data input section 102 into voice data acceptable mode from input disabled mode. While holding input key 108 down, the user can input voice data through voice data input section 102. When the user releases input key 108, controller 112 changes the mode of input section 102 into the input disabled mode.

Here will be described in some detail the voice data input operation. First, when the user inputs voice data on an article, with input key 108 been held down, an A/D converter built in voice data input section 102 converts the voice data into a digital signal. Next, controller 112 sends, to determining section 104, tag identifier 1 read by tag reading section 101 and the voice data entered through voice data input section 102. Receiving tag identifier 1 and the voice data, determining section 104 searches storing section 103 for tag identifier 1 that correspond to the tag identifier read by reading section 101. If the search fails to find matching tag identifier 1, storage section 103 newly stores the tag identifier and the voice data associated with the tag identifier. On the other hand, when determining section 104 finds tag identifier 1 identical to the tag identifier read by reading section 101, storage section 103 stores the voice data so as to associate with tag identifier 1, that is, an existing voice data is overwritten with the voice data just entered.

Now will be described how to replay voice data from article identifying device 100 with reference to FIG. 1.

Like the data input operation above, depressing readout key 107 enables controller 12 to send readout command to tag reading section 101. Receiving the command, tag reading section 101 reads out tag identifier 1 of tag 10 attached with an article. Determining section 104 judges whether or not tag identifier 1 read by tag reading section 101 is retained in storage section 103. When tag identifier 1 is found in tag/address table 103a of storage section 103, the voice data associated with tag identifier 1 is fetched from voice data table 103b. Receiving the voice data, voice data replay section 105 provides the data with digital-to-analog conversion, so that the data is replayed as a voice. On the other hand, when tag identifier 1 is not found in storage section 103, controller 112 activates the beeper (not shown) to go off a beep sound, telling the user that there is no record on the voice data.

Here will be described the structure of storage section 103 for retaining information including voice data, with reference to FIG. 2 through FIG. 4.

To make a quick search of storage section 103 for tag identifier 1 read by article identifying device 100, storage section 103 contains tag/address table 103a, in which tag identifier 1 is paired with the address of voice data table 103b where the voice data associated with tag identifier 1 is stored. Each time data is entered, the data is stored in tag/address table 103a. Determining section 104 searches tag/address table 103a whether tag identifier 1 is stored or not.

Now will be described the storing process of storage section 103 when voice data is entered one by one, using a plurality of tags 10 each of which has tag identifier 1 unregistered in storage section 103. In tag/address table 103a, the data is well organized in chronological order, i.e., the older data comes first, as shown in FIG. 2. The chronological order of the table can provide the user with an easy understanding of data history when the user confirms, by ears, the data one by one.

Next described is another storing process of storage section 103—in the case that the voice data, which is associated with already existing tag identifier 1 in tag/address table 103a, is overwritten with a new voice data, i.e., in the case that the user reuses tag 10 for an article to be newly identified. In this case, the data of tag/address table 103a is randomly stored, no longer kept in orderly time sequence. If table 103a stored data in the order ignoring time sequence, it would be difficult for the user to confirm the data one by one from the beginning of the table.

To address the inconsistency above, according to the embodiment, tag identifier 1 to be newly stored is always placed after the most recently stored record even if tag identifier 1 is already exists in tag/address table 103a, and then the older tag identifier 1 is blanked out. At the same time, all the records (each of which includes tag identifier 1 paired with the address data) consecutive to the blanked record are shifted backward in the chronological ordering, as shown in FIG. 4, to eliminate a vacant record in the table. In this way, tag identifier 1 can be sorted in the order of time sequence, that is, the well-organized data helps the understanding of the user when the user confirms, by ears, the data one by one.

Here will be described how to confirm the voice data stored in storage section 103 of article identifying device 100 without reading tag identifier 1 of tag 10. Suppose that tag/address table 103a has the contents shown in FIG. 4.

The user cannot confirm voice data stored in storage section 103 of device 100 until each tag identifier 1 of a plurality of tags 10 has to be read out. The procedure is troublesome, especially for a visually handicapped person, it would be difficult. Therefore, identifying device 100 should be furnished with the function that can replay the voice data stored in storage section 103 without reading tag 10.

In other words, it is necessary that device 100 can go into a voice-data replay mode without reading tag identifier 1 of tag 10. As an example among some possible choices, the structure of the embodiment realizes this by combination of readout key 107 and power key 111; specifically, with readout key 107 held down, turning the power ON by power key 111 allows device 100 to go into the voice-data replay mode.

After the voice-data replay mode has been established through the operation above, depressing readout key 107 enables device 100 to a) read the first record, i.e., the oldest record (in time-sequence) of tag/address table 103a; b) fetch a voice data from voice data table 103b, which is associated with the address stored in the oldest record; and c) replay the voice data as a voice from voice data replay section 105.

Each time the user depresses readout key 107, device 100 replays voice data one after another in the chronological order. Besides, when the user depresses key 107 while device 100 is replaying a voice data, device 100 skips the interrupted replay and replays next record. With the "fast forward" operation, the user can quickly confirm the voice data.

Although the replay of voice data is provided in the chronological order in the description above, it is not limited thereto; the replay in reverse chronological order, for example, by depressing readout key 107 for a predetermined period may be useful. With such a useful function equipped, device 100 can be user-friendly.

In the confirmation process of voice data, a replay of a voice data may make the user aware that tag 10 associated with the voice data has been lost or broken. In this case, during the interval that device 100 is replaying the voice data and/or after replaying, the user can depress erase key 110 for a predetermined period (for example, 10 seconds). Through the key operation, the voice-data-relating records in voice data table 103b and tag/address table 103a can be erased, whereby the useless area in storage section 103 is eliminated.

The description above has been given based on the premise that device 100 performs voice data input in communication with tag 10 through following processes: reading tag identifier 1 of tag 10, receiving a voice data through voice data input section 102, and then storing tag identifier 1 and the voice data associated therewith in storage section 103. Here will be described another input process used only device 100, with reference to FIG. 4. According to the input process, the user can input, in advance, voice data on articles to article identifying device 100, even if tag 10 is not there.

After that, the voice data stored in storage section 103 can be associated with tag 10 through the process below.

Storage section 103 contains memo data table 103c, which is used for the "in-advance" input. Table 103c can carry voice data for the duration of about 100 seconds. That is, when 5 seconds is spent for each record, 20 records of voice data (hereinafter referred to as memo) can be stored in table 103c. Table 103c provides sequential and cyclic read/write. Suppose that the records of table 103c are allocated to addresses of 1, 2, . . . K, K+1, . . . N−1, N. When a lot of voice data are stored in table 103c, each data is sequentially allocated at address 1 toward address N. When table 103c is fully occupied with voice data from address 1 to address N, successive data is sequentially overwritten from the record of address 1.

Now will be described the operation of the "in-advance" input-in this case, as described above, the voice data is associated with tag 10 after input operation.

First, voice data on articles is fed into article identifying device 100; specifically, holding input key 108 down, the user inputs (at least one piece of) voice data through voice data input section 102. The voice data is stored in memo data table 103c.

Next will be described how to associate the voice data in table 103c with tag 10.

When the user depresses memo key 109, voice data replay section 105 replays the voice data of address K where the latest voice data is stored. (If it is the first-time operation for the user and table 103c carries only one voice data, replay section 105 replays the voice data of address 1.) At this time, if the voice data is useless for the user, the user inputs new voice data, holding input key 108 down. In response to the key operation by the user, controller 112 of device 100 overwrites the voice data into memo data table 103c. When voice data is continuously coming through input section 102, controller 112 moves the address pointer to K+1 so that the incoming voice data is stored at the address where "the oldest" data is retained. Since memo data table 103c sequentially and cyclically stores voice data, the record (i.e., of address N+1) next to the record having current voice data (i.e., of address N) carries "the oldest" data.

On the other hand, depressing memo key 109 allows the user to audibly confirm the voice data stored in memo data table 103c. In response to the depression, voice data replay section 105 replays the voice data at address K where the latest voice data is retained. Further, another depression of key 109 allows the user to obtain the voice data previous to the latest data, i.e., the data at address K−1. In the confirmation process of voice data, controller 112 controls to move the address pointer in reverse chronological order so that the newer data comes first.

Associating process of voice data with tag 10 will be described below.

First, the user depresses memo key 109 to confirm a voice data stored in memo data table 103c. When the user depresses readout key 107 i) during the interval that device 100 is replaying the voice data; and/or ii) within a predetermined interval (e.g. 10 seconds) since the replay has been completed, tag reading section 101 reads tag identifier 1 of tag 10 to be associated. Through the readout, the voice data is stored in voice data table 103b, while tag identifier 1 and the address, which tells the location in table 103b of the voice data associated with tag identifier 1, is retained in tag/address data table 103a.

In this way, voice data can be entered into device 100 in advance, and then the data can be associated with tag 10.

With the "in-advance input", the user can conveniently input, as a reminder, voice data on an article purchased during shopping into device 100, and after that, the user can associate the voice data with tag 10.

As described earlier in the embodiment, the user can audibly confirm the voice data stored in voice data table 103b one by one. The confirmation process can be so designed that voice data replay section 105 replays a message notifying no more record on the completion of voice data replay. The user can thus know the end of the voice data replay.

In addition, controller 112 may contains a clock/calendar circuit, with which voice data can be stored with the date in voice data storage section 103. It is convenient for the user, in the voice data confirmation process, that voice data can be obtained together with date/time data on which the voice data is stored.

The clock/calendar function is exploitable in extracting the voice data stored in a user-specified period of time and replaying them.

Furthermore, the voice data and the date/time data can be used for tag 10, that is, the user can associate the date/time, on which tag 10 is read, with the voice data illustrating tag 10, so that voice data on tag 10 stored in a user-specified period of time can be obtained in the voice data confirmation process.

As another convenience, controller 112 controls voice data replay section 105 so as to replay by voice, at the beginning of the replay process, the number of records of the voice data stored in storage section 103.

Although the voice data entered through voice data input section 102 is converted into a digital signal before storage, it is not limited thereto; the voice data can be stored as the analog form.

Radio Frequency Identification System (RFID) tag is an example of tag 10 used in the embodiment. In this case, article identifying device 100 should read/write the RFID tag.

As described above, the article identifying device of the embodiment has high utility, especially for a visually impaired user, it will be a good help in daily life.

The user can make use of tag 10 in distinguishing, for example, books, containers carrying beverages, and bags containing medicines.

INDUSTRIAL APPLICABILITY

According to the article identifying device of the present invention, the user can easily confirm the voice data stored in the device, and can erase an undesired data from the device. The user can input voice data in the device in advance without a tag. After the input procedure, the user can associate the voice data with a tag.

The invention claimed is:

1. An article identifying device conducting a wireless communication with a tag, the article identifying device comprising:
   a tag reading section for reading the tag, the tag being a separate component from the article identifying device;
   a voice data input section for inputting voice data associated with the tag;
   a voice data storage section for storing the voice data input through the voice data input section, the voice data including a plurality of messages pertaining to each of a plurality of objects; and
   a voice data replay section for replaying the voice data stored in the storage section, wherein, the voice data can be audibly confirmed one by one each time the voice data replay section is depressed.

2. The article identifying device of claim 1, wherein the voice data replay section replays the voice data in chronological order.

3. The article identifying device of claim 1, wherein the voice data replay section replays a message notifying no more record in the storage section on the completion of voice data replay.

4. The article identifying device of claim 1, wherein the device further includes a clock/calendar circuit, voice data can be audibly confirmed with date/time data on which the voice data is stored.

5. The article identifying device of claim 4, wherein the clock/calendar circuit allows the device to replay voice data stored in a predetermined period.

6. The article identifying device of claim 4, wherein the clock/calendar circuit allows the device to replay voice data on the tag that has been read out in a predetermined period.

7. The article identifying device of claim 1, wherein the device further includes a clock/calendar circuit, voice data stored in a predetermined period can be audibly confirmed.

8. The article identifying device of claim 1, wherein the device further includes a clock/calendar circuit, allowing the device to replay voice data on the tag that has been read out in a predetermined period.

9. The article identifying device of claim 1, wherein the voice data replay section replays by voice the number of records of the voice data stored in the voice data storage section prior to the voice data replay.

10. The article identifying device of claim 1, wherein the device further includes voice data erasing means, and the voice data can be erased through depression of the means while the voice data replay section is replaying the voice data and/or after the voice data replay.

* * * * *